C. A. NUNEZ.
STEAM TRAP.
APPLICATION FILED APR. 13, 1914. RENEWED MAY 12, 1915.
1,143,550.
Patented June 15, 1915.
3 SHEETS—SHEET 1.
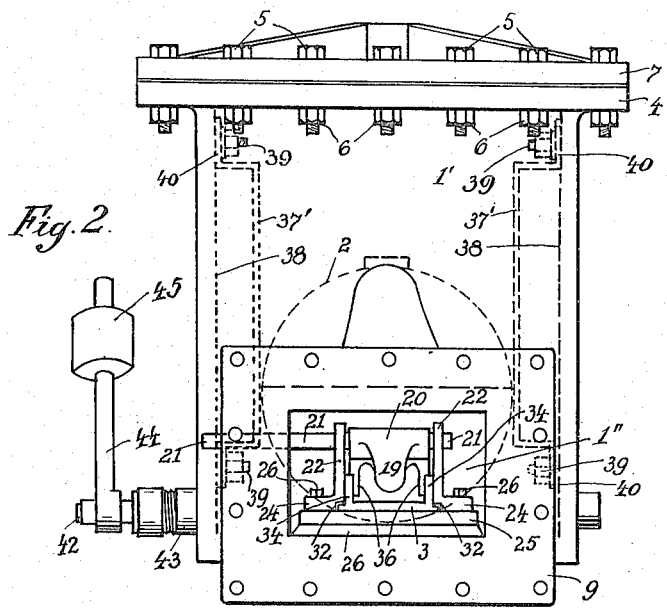
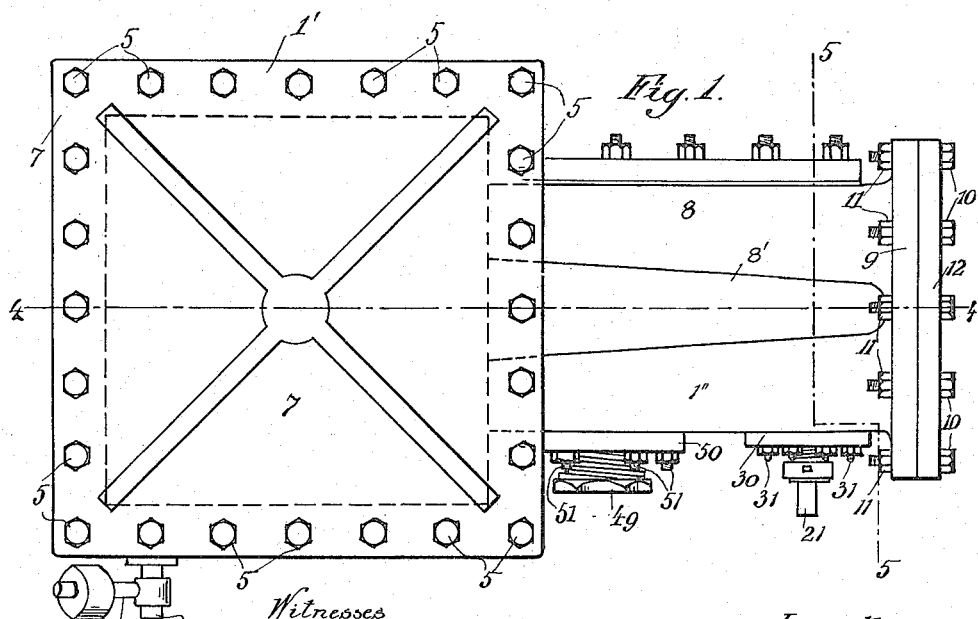
Witnesses
Inventor
CRESCENCIO ALFONSO NUNEZ
by
Attorneys

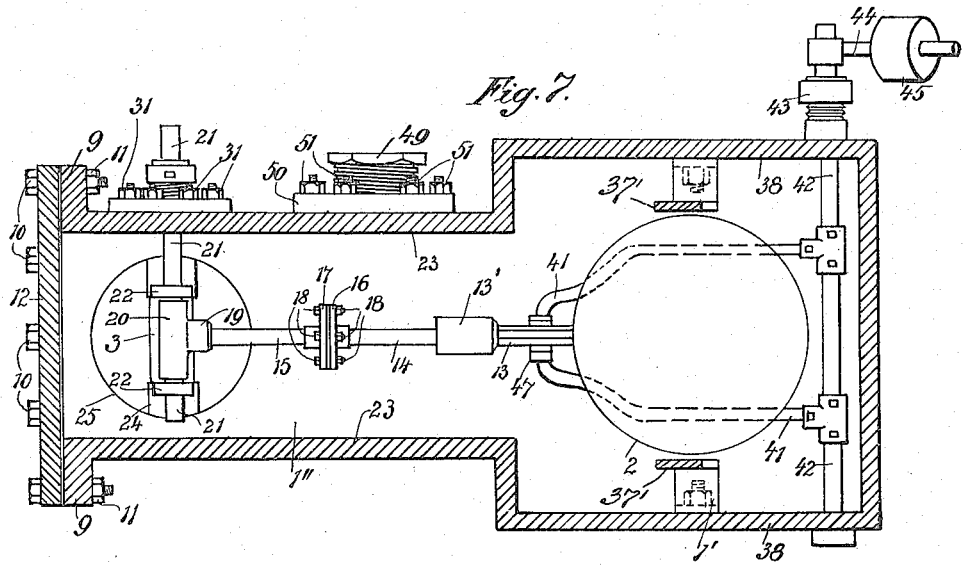
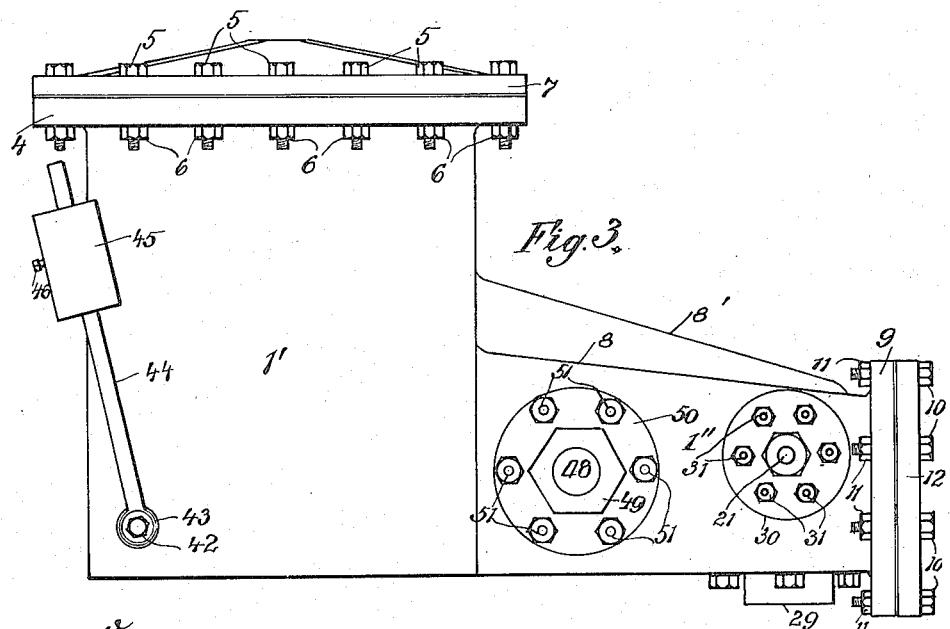

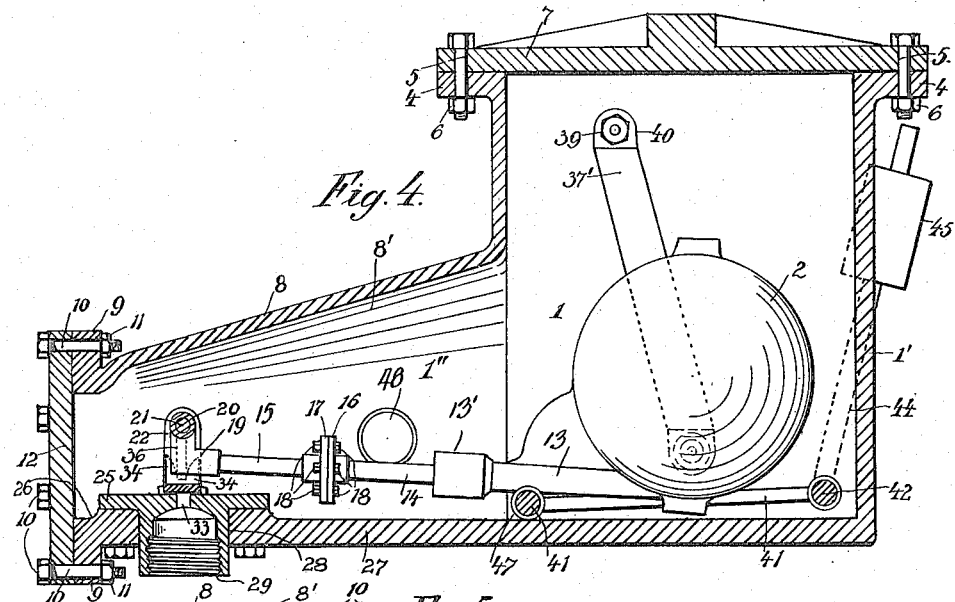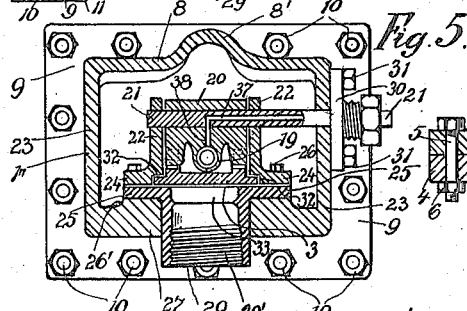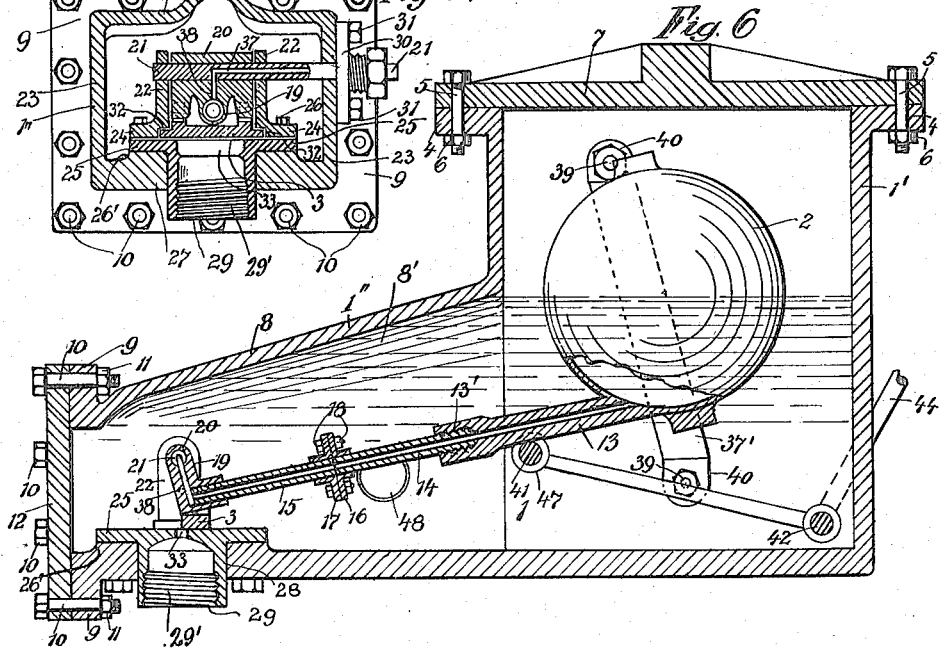

UNITED STATES PATENT OFFICE.

CRESCENCIO ALFONSO NUNEZ, OF CRUCES, CUBA.

STEAM-TRAP.

1,143,550. Specification of Letters Patent. Patented June 15, 1915.

Application filed April 13, 1914, Serial No. 831,525. Renewed May 12, 1915. Serial No. 27,665.

*To all whom it may concern:*

Be it known that I, CRESCENCIO ALFONSO NUNEZ, a citizen of the Republic of Cuba, and resident of Cruces, Province of Santa Clara, Cuba, have invented new and useful Improvements in Steam-Traps, of which the following is a specification.

This invention relates to steam traps.

It is an object of the invention to provide a trap wherein the condensate from the steam is collected until a suitable amount is within the trap whereupon the trap is automatically opened to discharge this condensate.

Another object of the invention is to provide a device of this kind wherein the condensate is readily discharged and wherein no obstructions are placed in the path of the same.

Another object of the device is to provide a steam trap, wherein the discharge opening for the condensate is controlled by a sliding valve.

Other objects will be more clearly understood by reference to the accompanying drawing and additional features will be more clearly pointed out in the appended claims.

In the drawing, Figure 1 is a top plan view of the trap. Fig. 2 is a front elevation of the same. Fig. 3 is a side elevation of the trap. Fig. 4 is a vertical section through the same on the line 4—4 of Fig. 1, showing the trap and the members thereof in the position in which the discharge of the condensate is obstructed. Fig. 5 is a transverse section in a vertical plane on line 5—5 of Fig. 1. Fig. 6 is a section similar to the section shown in Fig. 4 and illustrating the parts in a different position, the discharge aperture for the condensate being partly open, and Fig. 7 is a horizontal section through the trap.

Similar parts are indicated by similar reference characters throughout the drawings.

The trap comprises a casing 1 which is closed on all sides and which is divided into two chambers 1′ and 1″ respectively, said chambers being in communication with each other. The larger chamber 1′ serves as a receptacle for a float 2, while the smaller chamber 1″ holds a sliding valve 3, which controls the discharge aperture for the condensate. A flange 4 connected with the upper marginal portion of the chamber 1′ serves as a seat for the cover 7, which is connected with said flange by means of bolts 5 and nuts 6. The open end of the other chamber 1″ is also closed by means of a cover 12 which rests on the flange 9 of the chamber, the connection between flange and cover being effected by means of bolts 10 and nuts 11. As may be seen from Figs. 2 and 3 the smaller chamber 1 has a flat top wall 8 from which projects centrally a hollow ridge 8′ extending from the forward end of the chamber 1 in slanting direction upwardly toward the forward end of the chamber 1′. The float 2 in the chamber 1′ preferably is constructed in the form of a hollow ball and is secured to or formed integral with a pipe 13 extending from the lower portion of said ball and terminating in an enlarged nipple 13′ which is provided with an internal thread. Another pipe 14 is connected with the nipple by being threaded therein and is attached to a pipe 15 in axial alinement therewith by means of flanged disks 16 and 17, which are secured to the abutting ends of the pipes 14 and 15 and which are held together by means of bolts 18. An elbow 19 is secured to the forward end of the pipe 15 and the bore in said elbow communicates with the bore in the pipes 14 and 15. A transverse portion attached to the upper end of the elbow forms a bearing sleeve 20, which is pivoted upon a transverse shaft 21, said shaft being secured in uprights 22, parallel to the lateral walls 23 of the smaller chamber 1″. Foot portions 24 of the uprights 22 are secured to a flange 25, which rests on a boss 26′ projecting upwardly from the bottom 27 of the chamber 1″, the uprights being secured to the flange 25 by means of the screws 26, as clearly shown in Fig. 5. The bottom wall 27 of the chamber 1″ has a suitable aperture 28 in which a discharge spud 29 in integral connection with the flange 25 is inserted. This spud preferably is provided with internal thread 29′ to facilitate connection with a discharge pipe.

The shaft 21 which serves as pivot for the bearing 20 and elbow 19 is extended laterally and projects through one wall 23 of the chamber 1″. A packing disk 30 is mounted on the projecting end of the shaft and is securd to the wall of the chamber by means of screws 31. This disk is in connection with a threaded plug, which maintains the disk in central relation with respect to the shaft 21.

The uprights 22 are provided near their lower ends with grooves into which the side flanges 32 of the valve, shown in Fig. 5, project and whereby said valve is guided in its sliding movement over the discharge opening 33 in the flange 25 connected with the spud 29. The valve plate 3 is equipped adjacent each of the uprights 22 with a pair of projecting lugs 34. A lug 36 secured to the bearing sleeve 20 projects downwardly therefrom into the gap between each pair of lugs 34 of the valve plate, whereby an oscillation of said bearing sleeve will cause sliding movement of the valve plate 3. A bore 37 axially disposed in the shaft 21 communicates with a bore 38 which terminates in the elbow 19 whereby the contents of the float 2 may be brought into communication with the atmospheric air. It is obvious, therefore, that an ascending or descending movement of the float 2 will swing the pipe connections 13, 14 and 15 about the axis of the shaft 21 and will produce thereby a sliding movement of the valve plate 3.

In order to provide means for preventing a lateral displacement of the float within the chamber 1' guiding straps 37' are secured to the lateral walls 38 of the chamber 1' by means of bolts 39, said bolts extending through offset portions 40 of the straps, as shown in Fig. 2. From Figs. 4 and 6 it is obvious that these straps although being arranged in planes parallel to the walls 38 of the chamber extend at a slant from their upper end to their lower point of attachment whereby the float 2 in its swinging movement about shaft 21 will remain between said straps.

Adjustable counterbalancing means are provided for facilitating the ascending movement of the float within the chamber 1', said means comprising a pair of rods 41 pivotally secured within the chamber 1' by means of a shaft 42, extending transversely through said chamber and projecting at one side therefrom; the projecting end of the shaft 42 carries a stuffing box 43 and is rigidly connected with a lever 44 on which a counterweight 45 is adjustably mounted. The weight 45 may be held in adjusted position on the lever 44 by means of a set-screw 46, Fig. 3. The rods 41 extending forwardly from the shaft 42 are united at their forward end to form a bail-shaped member, the central portion of the bail carrying an antifriction roller 47, which is in engagement with the lower side of the extension 13 connected with the float.

The steam enters the trap through an aperture 48 in the chamber 1", said aperture being on the outside of the trap provided with a pipe nut 49 adapted to receive a connecting pipe and the connection being made by means of a flange 50, which is secured to the walls of the chamber by screws 51.

The operation of the device is as follows: Steam containing an excessive amount of moisture enters through the aperture 48 into the trap and the moisture is condensed primarily within the chamber 1". In proportion to the increase of the condensate within the trap the float 2 will assume a higher level, a movement in which it is aided on account of the provision of the counterweight 45. The movement of the float takes place in an arcuate path, the center of which is the shaft 21 adjacent the valve 3 which controls the discharge opening 33. Due to the lugs 36 which engage between the lugs 34 on the valve, the valve plate 3 is displaced in horizontal direction on the flange 25 of the spud 29 and when said valve has been shifted so as to open the aperture 33, the condensate from the trap will be discharged through the spud 29. The discharge of the condensate from the chamber 1" will lower the level of the condensate within the casing and the float 2 therefore, will descend. This movement of the float causes a sliding movement of the valve plate 3 in opposite direction to the first described movement so that said valve closes the aperture 33. It will be noted that the float 2 when in this lifted position is at a higher level than the bore 37 in the shaft 21 and any moisture which may have entered said float at the pipe joints or at other portions will be discharged by gravity through the pipe connections 13, 14 and 15 and through the elbow 19 so that the weight of the movable structure is not disturbed thereby.

It is thought that this invention and many of its advantages will be understood from the foregoing without further description, and it is obvious that various changes may be made in the form, construction and arrangement of the parts without departing from the spirit and scope of the invention, or sacrificing any of its advantages, the form hereinbefore disclosed being merely one preferred embodiment thereof.

I claim:

1. In a steam trap, the combination of a closed chamber adapted to receive condensate and having a discharge port, a valve normally closing said port and movable to open the same, a float within the chamber adapted to move in an arc of a circle under the influence of the condensate, connections between the valve and the float whereby the movements of the float control those of the valve, said connections between the float and the valve including a stem, and counterbalancing means for the float including a shaft journaled in the walls of the chamber transversely thereof adjacent the float, a bail shaped member secured to the shaft, antifriction means between the portion of the bail shaped member remote from the shaft and said float stem, and a weighted crank secured to the shaft on the outside of the chamber.

2. In a steam trap, the combination of a closed chamber having an inlet for condensate and a discharge port, a valve movable over said port and guarding the same, a float within the chamber movable in an arc of a circle under the influence of the condensate, connections between the float and the valve whereby the position of the valve is determined by that of the float, said connections between the valve and the float including a stem rigidly connected to the float, and counterbalancing means for the float comprising a shaft journaled transversely of and in the chamber below the float and on the opposite side thereof from the valve, a bail comprising two arms on opposite sides of the float connected to the shaft, an antifriction roller carried by the bail remote from the shaft and bearing against the underside of said stem, and a weighted lever secured to the shaft on the outside of the chamber and on the opposite side of the vertical plane of the shaft from said bail.

In testimony whereof I have hereunto set my hand and affixed my seal in the presence of the two subscribing witnesses.

CRESCENCIO ALFONSO NUNEZ. [L. S.]

Witnesses:
JULIAN GONZALES,
MAX BONAM.

Copies of this patent may be obtained for five cents each, by addressing the "Commissioner of Patents, Washington, D. C."